May 12, 1953     H. P. PHILLIPS     2,638,393
PISTON RING
Filed March 30, 1951
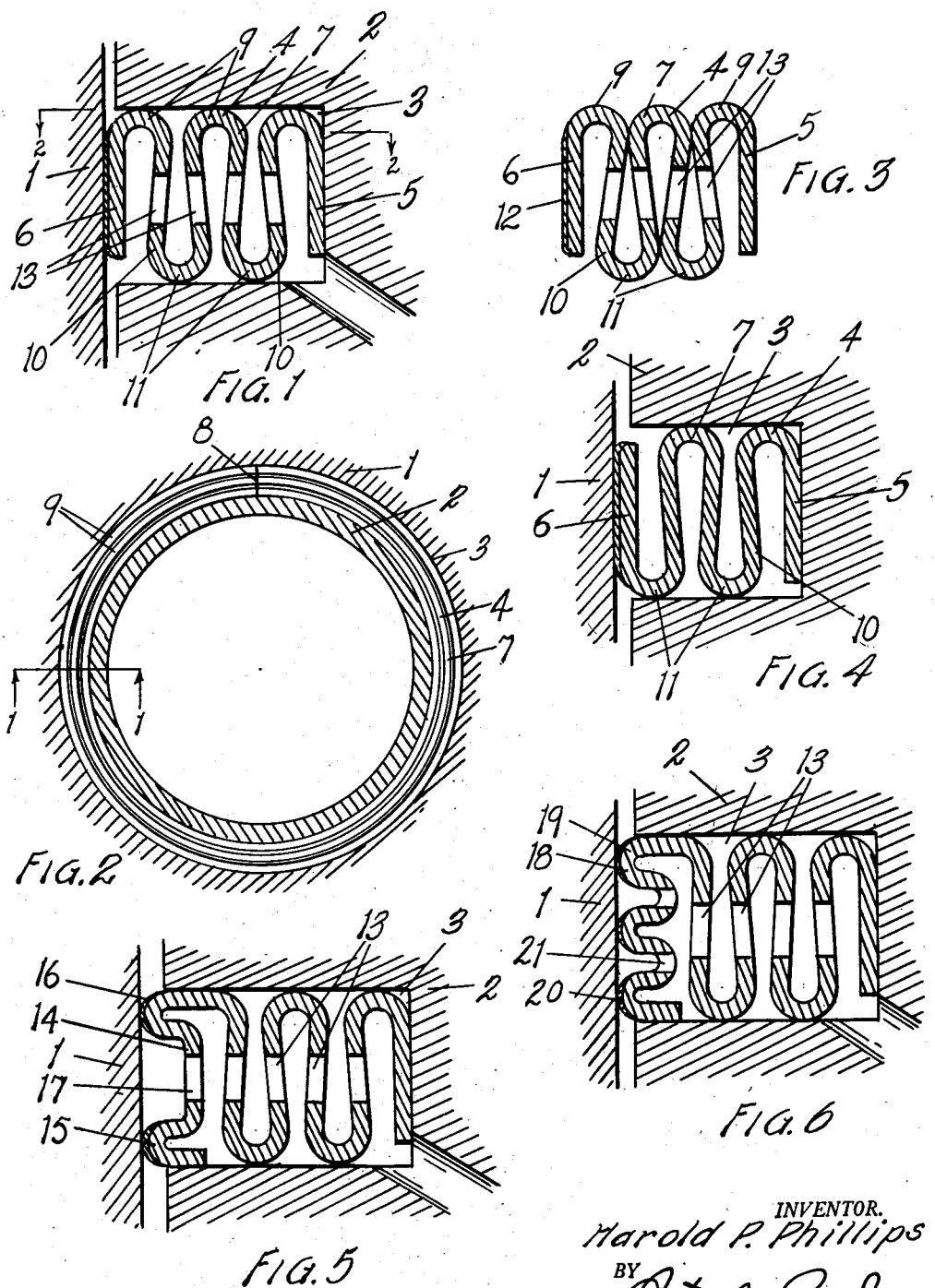

Patented May 12, 1953

2,638,393

UNITED STATES PATENT OFFICE 2,638,393

PISTON RING

Harold P. Phillips, Hastings, Mich., assignor to Hastings Manufacturing Co., Hastings, Mich.

Application March 30, 1951, Serial No. 218,444

14 Claims. (Cl. 309—45)

This invention relates to improvements in piston rings.

This application is a continuation in part of my application for Letters Patent filed January 6, 1947, Serial No. 720,461, now Patent No. 2,569,778.

The main objects of this invention are:

First, to provide a piston ring element formed entirely of ductile metal which may be readily and economically fabricated and is not likely to become broken or distorted in use.

Second, to provide a piston ring element which embodies radial resilience or springability, thereby effectively maintaining contact with the cylinder wall.

Third, to provide a piston ring element adapted by a bellows-like action exerting spring pressure on the cylinder wall.

Further objects relating to details and economies of my invention will be apparent from a consideration of the description and claims.

A preferred embodiment of the invention is illustrated in the accompanying drawing, in which:

Fig. 1 is a fragmentary longitudinal section of a cylinder and piston with a piston ring embodying my invention installed therein, the section being on a line corresponding to line 1—1 of Fig. 2.

Fig. 2 is a transverse section on a line corresponding to line 2—2 of Fig. 1.

Fig. 3 is a radial section through another embodiment of my invention shown in Fig. 1 the ring being shown without regard to the curvature thereof.

Fig. 4 is a fragmentary longitudinal section corresponding to that of Fig. 1 of a modified form or embodiment of my invention adapted as a compression ring.

Fig. 5 is a fragmentary longitudinal section corresponding to Fig. 1 of another form or embodiment of my invention adapted as an oil ring.

Fig. 6 is a fragmentary longitudinal section similar to Fig. 5 of a further modification of my invention.

In the accompanying drawings, 1 represents a cylinder and 2 a piston having a piston ring groove 3 therein. It should be borne in mind in considering the accompanying drawings that no attempt has been made to show the parts in their relative proportions or to show the cylinder and piston clearances or the clearances or tolerances of the ring element in the piston ring groove.

The ring element of my present invention designated generally by the numeral 4 is formed integrally of ductile ribbon or strip stock zigzag folded upon itself to provide concentric inner and outer members 5 and 6 and intermediate loop-like members 7 springably supporting the members 5 and 6, urging the member 6 against the cylinder wall when the member 5 is supported on the bottom of the piston ring groove. The folded strip is coiled upon itself to form the ring element with the split 8 and has inherent resiliency as a result of such coiling. The ring when installed is under radial compression so that it engages the cylinder wall with spring thrust as a result of such compression as well as the radial springability of the ring resulting from its cross sectional formation. The intermediate members 7 are the result of zigzag folding of the stock and have curved bights 9 and converging side reaches 10 which merge into the curved bights, the bights 11 joining the intermediate members to the inner and outer members 5 and 6.

As shown in the drawing, the adjacent folds are spaced as illustrated in Figs. 1, 4, 5 and 6 where a wide range of adaptation is desired, that is, where the rings are designed for use in grooves of different depths. However, the bights of the loops may be in abutting relation as shown in Fig. 3. The springable loop members being disposed in bellows-like formation engage the cylinder wall with a bellows-like spring action. The bights 9 and 11 coact with the side walls of the piston ring groove. The ring element of my invention is particularly desirable in that it is not subject to breakage or likely to be permanently distorted in manipulation to install the same. The element is of uniform strength and tension from end to end.

In the embodiment shown in Figs. 1 to 4 inclusive the outer or cylinder wall engaging member 6 is provided with a chrome plated cylinder wall face 12.

In the embodiment shown in Figs. 1, 2 and 3 the edge of the cylinder wall engaging member is directed downwardly and this is a preferred installation for oil or scraper rings.

In the embodiment shown in Figs. 2 and 3 the intermediate ring members are provided with drain openings 13.

The embodiment shown in Fig. 4 is designed as a compression ring and the edge of the outer or cylinder wall engaging member 6 is directed upwardly. In this embodiment no drain openings are provided. The compression thrust acts to urge the cylinder wall engaging member against the cylinder wall in all these embodiments.

In the embodiment shown in Fig. 5 the cylinder wall engaging member 14 is provided with axially spaced ribs 15 constituting cylinder wall engaging elements. The crowns of these ribs are curved and they are provided with chrome plating 16 which extends onto the sides of the ribs, this provides in effect a line contact for the cylinder wall elements with the cylinder wall and owing to the wearing qualities of the chrome this line contact is maintained during a very long period of wear. In this embodiment the outer member 14 is provided with drain openings 17 between the cylinder wall engaging elements 15.

The embodiment shown in Fig. 6 is similar to that of Fig. 5 with the exception that the outer member 18 is peripherally corrugated to provide several annular cylinder wall engaging elements 19 the crowns of which are chrome plated at 20. Drain openings 21 are provided between the cylinder wall engaging elements 19.

All of these structures are designed to dispense with the use of expanders. However, if the piston rings are installed in grooves that are of a depth substantially exceeding that for which the ring is designed to be used an expander or a filler may be inserted in the bottom of the piston ring groove.

I have illustrated and described my invention in practical embodiments thereof. I have not attempted to illustrate or describe other adaptations or embodiments as it is believed that this disclosure will enable those skilled in the art to embody or adapt my invention as may be desired.

Having thus described my invention, what I claim as new and desire to secure by Letters Patent is:

1. A split resilient radial piston ring element formed of integral ductile resilient sheet metal of substantially uniform thickness throughout zigzag folded to provide radially concentric outer and inner parallel members, and loop-like radially springable intermediate members radially concentric to the outer and inner members and having curved bights and converging reaches merging into the bights, adjacent bights of the intermediate members being initially spaced and disposed to positioningly coact with the opposite side walls of a piston ring groove, the outer member constituting a cylinder wall engaging member and the inner member being adapted to supportedly engage the bottom of a piston ring groove, bights of the intermediate members being adapted to coact with the side walls of a piston ring groove in which the element is installed.

2. A split resilient radial piston ring element formed of integral ductile resilient sheet metal of substantially uniform thickness throughout zigzag folded to provide radially concentric outer and inner parallel members, and loop-like radially springable intermediate members radially concentric to the outer and inner members and having curved bights and converging reaches merging into the bights, the bights being disposed to positioningly coact with the opposite side walls of a piston ring groove, the outer member constituting a cylinder wall engaging member and the inner member being adapted to supportedly engage the bottom of a piston ring groove, bights of the intermediate members being adapted to coact with the side walls of a piston ring groove in which the element is installed.

3. A split resilient radial piston ring element formed of integral ductile sheet metal of substantially uniform thickness throughout zigzag folded to provide radially concentric outer and inner parallel members, and loop-like radially springable intermediate members radially concentric to the outer and inner members and having curved bights and converging reaches merging into the bights, the bights being disposed to positioningly coact with the opposite side walls of a piston ring groove, the bights adjacent of the intermediate members being spaced, and the outer member constituting a cylinder wall engaging member and the inner member being adapted to supportedly engage the bottom of a piston ring groove.

4. A split resilient piston ring element formed of an integral ductile sheet metal ribbon-like member folded to provide radially concentric outer and inner walls, and loop-like radially springable members concentric to and intermediate said inner and outer walls said loop-like members having drain openings therein, the outer wall constituting a cylinder wall engaging member and the inner wall being disposed for engagement with the inner peripheral wall of a piston ring groove, the bights of the loop-like members being disposed to positionally coact with the opposite side walls of a piston ring groove, said loop-like members being of a bellows-like formation and disposed to transmit pressure from the inner wall to the outer wall with a bellows-like action.

5. A split resilient piston ring element formed of an integral ductile resilient sheet metal ribbon-like member of substantially uniform thickness throughout folded to provide concentric outer and inner walls, and loop-like radially springable members radially concentric to and intermediate said inner and outer walls, the outer wall constituting a cylinder wall engaging member and the inner wall being disposed for engagement with the inner peripheral wall of a piston ring groove, the bights of the loop-like members being disposed to positionally coact with the opposite side walls of a piston ring groove, said loop-like members being of a bellows-like formation and disposed to transmit pressure from the inner wall to the outer wall with a bellows-like action.

6. A split resilient piston ring element formed of an integral ductile sheet metal ribbon-like member folded to provide concentric outer and inner walls, and loop-like members concentric to and intermediate said inner and outer walls, the outer wall having chrome plating thereon and constituting a cylinder wall engaging member, the bights of the loop-like members being disposed to positionally coact with the opposite side walls of a piston ring groove.

7. A split resilient piston ring element formed of an integral ductile resilient sheet metal ribbon-like member of substantially uniform thickness throughout folded to provide radially concentric outer and inner walls, and loop-like radially springable members radially concentric to and intermediate said inner and outer walls, the outer wall constituting a cylinder wall engaging member, the bights of the loop-like members being disposed to positionally coact with opposite side walls of a piston ring groove.

8. An annular split resilient piston ring element formed of an integral ductile sheet metal ribbon-like member folded to provide concentric outer and inner members and loop-like members concentric to and intermediate said inner and outer members the outer members constituting a cylinder wall engaging member and having peripheral corrugations therein providing a plurality of axially spaced cylinder wall engaging elements, the crowns of said elements being curved and having chrome plating thereon, said plating being extended upon the sides of the corrugations, said cylinder wall engaging member and said intermediate members having drain openings therein, the drain openings in the outer member being between its said cylinder wall engaging elements, the inner member being disposed for engagement with the bottom of a piston ring groove and the bights of the loop-like members being disposed to coact with the opposite side walls of a piston ring groove, said loop-like members being of a bellows formation and disposed to transmit pressure from the inner member to the outer member with a bellows-like action.

9. An annular split resilient piston ring element formed of an integral ductile sheet metal ribbon-like member folded to provide concentric outer and inner members and loop-like members concentric to and intermediate said inner and outer members the outer members constituting a cylinder wall engaging member and having peripheral corrugations therein providing a plurality of axially spaced cylinder wall engaging elements, said cylinder wall engaging member and said intermediate members having drain openings therein, the drain openings in the outer member being between its said cylinder wall engaging elements, the inner member being disposed for engagement with the bottom of a piston ring groove and the bights of the loop-like members being disposed to coact with the opposite side walls of a piston ring groove, said loop-like members being of a bellows formation and disposed to transmit pressure from the inner member to the outer member with a bellows-like action.

10. An annular split resilient piston ring element formed of an integral ductile sheet metal ribbon-like member folded to provide concentric outer and inner members, and loop-like members concentric to and intermediate said inner and outer members, the outer member constituting a cylinder wall engaging member having peripheral axially spaced ribs providing a plurality of axially spaced cylinder wall engaging elements, the crowns of said elements having chrome plating thereon, the inner member being disposed for engagement with the bottom of a piston ring groove and the bights of the loop-like members being disposed to coact with the opposite side walls of a piston ring groove, said loop-like members being of a bellows formation and disposed to transmit pressure from the inner member to the outer member with a bellows-like action.

11. An annular split resilient piston ring element formed of an integral ductile sheet metal ribbon-like member folded to provide concentric outer and inner members, and loop-like members concentric to and intermediate said inner and outer members, the outer member constituting a cylinder wall engaging member having peripheral axially spaced ribs providing a plurality of axially spaced cylinder wall engaging elements, the crowns of said elements having chrome plating thereon.

12. An annular split resilient piston ring element formed in an integral ductile sheet metal ribbon-like member folded to provide concentric outer and inner members and loop-like members concentric to and intermediate said inner and outer members, the outer members having peripheral corrugations therein providing a plurality of axially spaced cylinder wall engaging elements, said wall engaging member and said intermediate members having drain openings therein, the drain openings in the outer member being between its said wall engaging elements.

13. An annular split resilient piston ring element formed of an integral ductile sheet metal ribbon-like member folded to provide concentric inner and outer members, and loop-like members concentric to and intermediate the said inner and outer members, the outer member being conformed to provide axially spaced annular wall engaging elements, the said wall engaging elements being peripherally chrome plated, the outer wall member and said intermediate member having drain openings therein, the drain openings of said outer wall member being between its said cylinder wall engaging elements.

14. An annular split resilient piston ring element formed of an integral ductile sheet metal ribbon-like member folded to provide concentric inner and outer members, and loop-like members concentric to and intermediate the said inner and outer members, the outer member being conformed to provide axially spaced annular wall engaging elements, the outer wall member and said intermediate member having drain openings therein, the drain openings of said outer wall member being between its said cylinder wall engaging elements.

HAROLD P. PHILLIPS.

References Cited in the file of this patent

UNITED STATES PATENTS

| Number | Name | Date |
| --- | --- | --- |
| 2,267,366 | Bowers | Dec. 23, 1941 |
| 2,267,368 | Bowers | Dec. 23, 1941 |
| 2,292,042 | Bowers | Aug. 4, 1942 |
| 2,466,474 | Phillips | Apr. 5, 1949 |
| 2,474,493 | Phillips | June 28, 1949 |

FOREIGN PATENTS

| Number | Country | Date |
| --- | --- | --- |
| 561,569 | Great Britain | May 24, 1944 |